United States Patent
Gonzalez-Velazquez

(10) Patent No.: US 8,194,693 B2
(45) Date of Patent: Jun. 5, 2012

(54) AUTONOMOUS WIRELESS NETWORKS

(75) Inventor: Antonio E Gonzalez-Velazquez, Ipswich (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 837 days.

(21) Appl. No.: 12/294,122

(22) PCT Filed: Mar. 30, 2007

(86) PCT No.: PCT/GB2007/001190
§ 371 (c)(1),
(2), (4) Date: Sep. 23, 2008

(87) PCT Pub. No.: WO2007/113529
PCT Pub. Date: Oct. 11, 2007

(65) Prior Publication Data
US 2009/0122779 A1 May 14, 2009

(30) Foreign Application Priority Data
Apr. 3, 2006 (EP) .................................. 06251879

(51) Int. Cl.
*H04J 3/00* (2006.01)

(52) U.S. Cl. .......................................... 370/435

(58) Field of Classification Search .............. 370/247, 370/248, 478, 252
See application file for complete search history.

(56) References Cited

U.S. PATENT DOCUMENTS

| | | | | |
|---|---|---|---|---|
| 5,719,868 | A | * | 2/1998 | Young .......................... 370/436 |
| 2002/0184389 | A1 | | 12/2002 | Sherman |
| 2005/0041598 | A1 | * | 2/2005 | Cho et al. ...................... 370/252 |
| 2005/0074025 | A1 | * | 4/2005 | Shao et al. ..................... 370/461 |
| 2007/0140322 | A1 | * | 6/2007 | Wang et al. .................... 375/149 |
| 2007/0195702 | A1 | * | 8/2007 | Yuen et al. ..................... 370/238 |

FOREIGN PATENT DOCUMENTS

| | | |
|---|---|---|
| EP | 1 631 012 | 3/2006 |
| WO | 03/019798 | 3/2003 |
| WO | 2004/004181 | 1/2004 |

OTHER PUBLICATIONS

Ephremides et al., "Scheduling Broadcasts in Multihop Radio Networks", *IEEE Transactions*, vol. 38, No. 4, Apr. 1990, pp. 456-460, XP002400385.

(Continued)

*Primary Examiner* — Hassan Kizou
*Assistant Examiner* — Charles C Jiang
(74) *Attorney, Agent, or Firm* — Nixon & Vanderhye P.C.

(57) ABSTRACT

A device is operable to use received signals to divide time into a succession of frames, each frame having plural consecutive timeslots, and into a succession of four or more superframes. A transmitter is operated only in a single timeslot in one frame. A receiver is operated in the other timeslots in the frame and for all timeslots of immediately preceding and following frames, and in no other frames. This allows devices to predict periods in which to hibernate or carry out intensive tasks. The device determines which timeslots of the first frame are occupied to provide local awareness information, and transmits it as a code on its transmit timeslot along with payload data. This allows other devices in a network to obtain information about their local environment and about the environment of their neighbors. Routing decisions are made on this basis.

16 Claims, 4 Drawing Sheets

OTHER PUBLICATIONS

Amouris K Ed—Institute of Electrical and Electronics Engineers, "Space-time division multiple access (STDMA) and coordinated, power-aware MACA for mobile and hoc networks", *Globecom '01, 2001 IEEE Global Telecommunications*, vol. 5 of 6, Nov. 2001, pp. 2890-2895, XP010747562.

Zhang, H., et al., "Performance Analysis of Time-Spread Multiple Access (TSMA) Protocol in Multihop Wireless Networks," Performance, Computing and Communications, IEEE, Feb. 1998, pp. 402-408 XP 10270599.

European Search Report dated Sep. 7, 2006 in EP 06 25 1879.

European Search Report dated Sep. 26, 2006 in EP 06 25 1889.

Mouly, M., et al., "The GSM System for Mobile Communications," GSM System for Mobile Communications, Comprehensive Overview of the European Digital Cellular Systems, AS.L.U.; Cell & Sys, 1992, pp. 215-216, XP 002180573, ISBN: 2-9507190-0-7.

Liu, A., et al, "An Energy-efficiency and Collision-free MAC Protocol for Wireless Sensor Networks," 2005 IEEE $61^{st}$ Vehicular Technology Conference, VTC2005-Spring (IEEE Cat. No. 05CH37631) IEEE Piscataway, NJ, vol. 2, 2005, pp. 1317-1322, XP002400386, ISBN: 0-7803-8887-9.

U.S. Appl. No. 12/294,128, Gonzalez-Valazquez, filed Sep. 3, 2008.

International Search Report for PCT/GB2007/001184 mailed Jun. 6, 2007.

International Search Report for PCT/GB2007/001190 mailed Jun. 18, 2007.

* cited by examiner

AUTONOMOUS WIRELESS NETWORKS

This application is the U.S. national phase of International Application No. PCT/GB20071001190 filed 30 Mar. 2007 which designated the U.S. and claims priority to European Patent Application No. 06251879.0 filed 3 Apr. 2006, the entire contents of each of which are hereby incorporated by reference.

This patent application is related to a patent application filed by the same applicant on even date herewith having an internal reference of A31068, and claiming priority from European Patent Application 06251889.9.

The invention relates to autonomous networks of wireless devices, and has been developed for use in sensor networks for monitoring environmental conditions in situations where it is not practical to provide a fixed infrastructure, such as oceanography. However, the invention is also applicable in other fields in which wireless devices are free to move relative to each other, and there is little or no fixed infrastructure. Example applications include battlefield use, disaster recovery, and inter-vehicle communication ("traffimatics").

The wireless devices have numerous conflicting requirements, particularly as regards prolonged battery life and reliability and speed of the communication of data to a data collection station. In general, communication reliability and data relay speed can be improved by increasing transmitter power and the frequency at which data is transmitted, although these measures increase power consumption and thus reduce battery life.

Furthermore, the provision of wireless devices which are free to move, for instance on ocean currents, provides challenges since the devices can then move relative to one another, giving rise to changes in network topography over time. This is particularly problematic when the devices are used as relays to pass data towards a base station from devices too remote to access the base station directly since the reliability, and indeed existence, of communication paths is sensitive to the correct operation of every device in the path and to the reliability of the links between each device and the devices immediately upstream and immediately downstream of it in the path. The reliability of a link can be compromised by environmental conditions, for instance the presence of waves or land masses, as well as by the physical distance between the devices at the ends of the link.

The present invention was made in this context. According to a first aspect of the invention, there is provided a method of operating a plurality of wireless devices each including a receiver and a transmitter, the method comprising:

controlling each device to divide time into a succession of frames, each frame having plural timeslots, and into a succession of superframes, each superframe having plural frames;

operating the receiver in each device in at least some of the timeslots of a first frame over plural superframes, determining from the signals received by the receiver which of the at least some timeslots of the first frame are occupied by transmissions from the other devices;

using the result of the determination to generate data relating to the presence and operational status of the other devices; and transmitting data for reception by other devices, the data including the presence and operational status data generated by the device.

This invention provides each device with information about its local environment and about the environment of its neighbours. Devices can thus be provided with information to allow them to make informed decisions concerning their operation, for instance the selective transmission of payload data. Moreover, this can be achieved with a relatively low signalling overhead.

The method may comprise operating the transmitter in a transmit timeslot to transmit payload data, the transmit timeslot occurring at a certain position in the first frame in each superframe; and operating the receiver in all other timeslots of the first frame. Allocating a certain timeslot to the device allows other devices to be able accurately to determine the relationship of the device to other devices, and can allow the other devices to make informed decisions concerning their operation accordingly. The payload data may originate with the device, or it may be data received from another device. In the embodiments, the presence and status data allows the devices to determine whether an individual neighbour is at a greater, lesser, or identical hop distance from a specified base station. This allows the devices to be used as relays to transmit payload data towards a base station where the data is to be collected.

The method may comprise transmitting the local awareness information in the transmit timeslot. This is advantageous since it avoids the need for separate communication channels to communicate the local awareness information and payload data. It also has power-saving benefits for the device, since, for a given total transmission time, powering-up a transmitter only once is more efficient than powering-up the transmitter plural times.

The transmitted local awareness information may comprise a code having a single bit for each timeslot that the local awareness information relates to. This allows a particularly low signalling overhead whilst providing devices with an amount of information sufficient to allow them to make informed decisions concerning their operation.

The determination of whether a timeslot is occupied may comprise determination of whether data is decodable from a signal received in that timeslot. This is advantageous since the device determines that a timeslot is occupied only if information is able to be received in that timeslot. Although determination of whether a timeslot is occupied could be done in some other manner, for instance by comparing a measure of received signal strength to a threshold, this would not detect collisions. The preferred method allows the device to determine whether a timeslot is singly occupied.

Preferably, the determination of whether a timeslot is occupied comprises monitoring signals received in that timeslot over plural superframes. This allows the local awareness information to reflect the reliability of the link, instead of indicating the success of the link at a particular singular point in time. For instance, the device may perform a rolling average over a number of superframes, for instance eight superframes. If the number of superframes is sufficiently small, the determination as to timeslot occupation is subject to change relatively quickly if the reliability of packet transmissions changes.

The method may comprise operating the receiver in one or more timeslots of a second frame, the second frame having a location in the superframe different to the first frame; and transmitting payload data received in a transmit timeslot of the second frame in a timeslot of the first frame. In this way, a hierarchy of devices can be formed, with the device contributing to relaying data from devices below it in the hierarchy to a device at a highest level in the hierarchy. The level of a device in the hierarchy is set by, and can be determined from, the frame in which it has its transmit slot, with devices at a given level having transmit timeslots in the same frame.

The method may comprise providing and transmitting local awareness information relating to the occupation of the timeslots of the first and second frames. This provides other devices with still further useful information about their local environment and about the environment of their neighbours.

It is advantageous for the method to comprise operating the receiver in one or more timeslots of a third frame, the third frame having a location in the superframe different to the first and second frames, and providing and transmitting local awareness information relating to the occupation of the timeslots of the third frame. This allows the device to be active also in respect of devices in a level above it in the hierarchy. It allows the device to provide information which can be useful to devices in the level immediately above the level in which the device is found, and to devices at the same level in the hierarchy as the device.

Preferably, the method comprises storing local awareness information received from neighbouring devices. In this case, the method may comprise storing received awareness information according to the timeslot in which the local awareness information was received. This allows the device easily to identify and process the local awareness information which relates to a particular neighbouring device. Furthermore, the device may be arranged to analyse the local awareness information received from a second device in a particular timeslot over plural superframes to make a determination as to the reliability of links between the second device and one or more devices neighbouring the second device. This allows the device to obtain information about the devices from which the second device is able to receive transmissions even though those other devices might be out of range of the device. Here, the device may be operable to make decisions as to whether to forward received data bases on the received local awareness information.

Optionally, the device is operable to monitor the number of successful and unsuccessful transmissions from a target device to the device, to calculate a number based on the result of the monitoring, and to transmit an item of payload data on a number of occasions equal to the calculated number. Here, the device may be operable to calculate the number based also on local awareness information received in a timeslot relating to the target device.

Any of the methods may be implemented by a computer program, which may be encoded on a carrier capable of being loaded into a suitable general-purpose computer.

According to a second aspect of the invention, there is provided a device including a receiver and a transmitter, the device being configured:

to use received signals to divide time into a succession of frames, each frame having plural timeslots, and into a succession of superframes, each superframe having plural frames;

to operate the receiver in at least some of the timeslots of a first frame over plural superframes;

to determine which of the at least some timeslots of the first frame are occupied, to use the result of the determination to generate data relating to the presence and operational status of the other devices; and to transmit data for reception by other devices, the data including the presence and operational status data generated by the device.

Embodiments of the invention will now be described, by way of example only, with reference to the accompanying drawings, in which.

Figure 1:
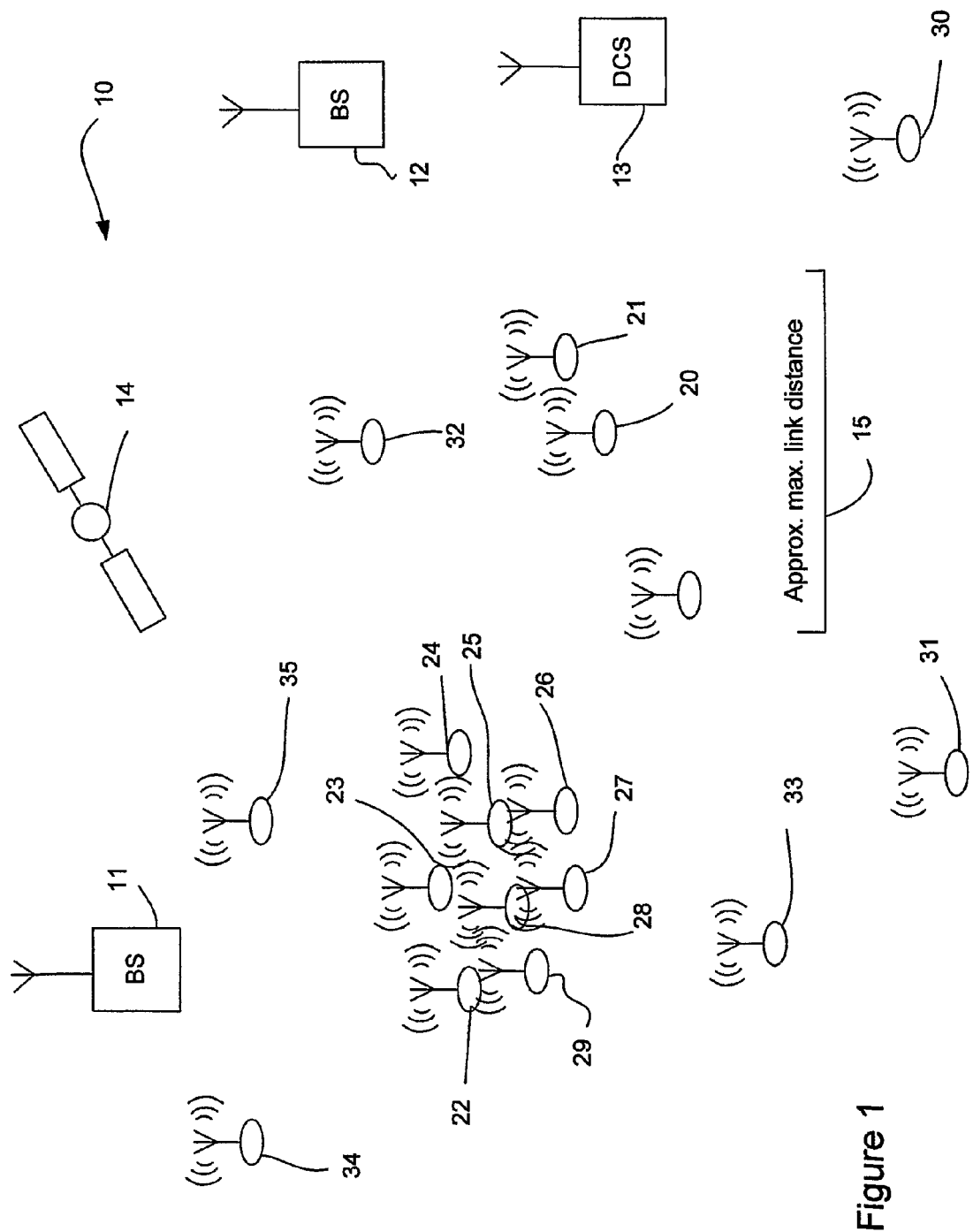
FIG. 1 is a schematic diagram illustrating network topography and incorporating aspects of the invention.

Referring firstly to FIG. 1, certain components of a system 10 are illustrated to aid understanding of network topography. A number of base stations, in this example first and second base stations 11, 12, are operable to send data to a data collection station 13. In FIG. 1, a communications satellite 14 is used to relay data from the base stations 11, 12 to the data collection station 13, although any other suitable bi-directional or unidirectional communications medium may be used. The base stations 11, 12 may be located in fixed locations, for instance by being tethered or by being located on land, or they may be freely moveable, for instance free-floating.

The system comprises plural free-moving or free-floating wireless devices, some of which are referenced at 20 to 35. For the purposes of illustration, a line 15 illustrates the distance over which devices would typically be able to communicate, although the distance depends on numerous factors. Also, there is no cut-off as to the distance over which devices can communicate; instead, link reliability decreases rapidly with increasing distance.

The Figure is illustrative of the device distribution or arrangement that can arise. Although the devices ideally would be placed in, and remain in, a regular pattern in which each device could communicate efficiently with only a small number of neighbouring devices, for instance four or five, this is not normally practicable. Thus, the Figure represents a realistic implementation in that some devices (e.g. devices 20, 21) are located very close to one another, some (e.g. devices 22 to 29) are grouped together, some (e.g. device 30) do not have any close neighbours, and some (e.g. devices 31, 32) have only one or two close neighbours.

This contrasts with typical cellular networks, since network density and hence topology cannot be easily controllable. To monitor environmental conditions, device placement follows "application" priorities, i.e. sensors need to be placed where the phenomenon of interest occurs or, if they are free to move (for example to monitor natural flows such as lava, atmospheric or ocean currents, glaciers, or animal migration) their positions depend on the property being monitored. These locations are not necessarily optimal for wireless communication. Increasing the numbers of devices is not always allowed and when allowed is not always desirable, for instance if such could obstruct or modify natural activity.

FIG. 1 also illustrates how communication paths to a base station 11, 12 can be formed. For instance, data from device 31 can be relayed to the first base station 11 via a first hop to the device 33, via a second hop to any of the devices 20-29, then a third hop to one of devices 34 and 35, and a fourth and final hop to the first base station 11. Alternatively, the data can be relayed to one of the devices 22 to 29 as a second hop from the device 33 then be hopped between the devices 22 to 29 before being hopped to the first base station 11 via one of the devices 34, 35. Alternative routes to the first base station 11 include devices located closer to the second base station 12. Similarly, numerous routes between the device 31 and the second base station 12 also exist.

For the sake of explaining the workings of this invention, we use the following definitions. The minimum number of hops (in other words, the number of hops forming the shortest reliable path) needed from a device to a base station is known as the hop depth or hop level. The hop distance between two devices is the mathematical difference between the hop depths of the two corresponding devices Consequently, the base stations 11, 12 have a hop depth of zero, the group of devices in reception range for direct transmissions generated by a base station have a hop depth of one, and so on. It can be said that hop depth provides an absolute metric (total distance to base station); hop distance provides a relative metric (closer to base station, at the same level, etc). The system uses the perception of hop distance for its operation. This specification occasionally uses the term hop depth for ease of explanation.

It will be clear that the efficiency of the system in delivering data from a device to the data collection station 13 depends on the number of transmissions of that data. The number of hops and the number of parallel routes over which the data is passed plays a crucial role in this. However, without central monitoring of the devices 20 to 35 and central control over them, the devices themselves need to be provided with means for deciding whether and, if so how, to retransmit received data. Neighbouring devices also need to establish regular communication for correcting measuring parameters and sharing data. Network performance greatly depends on the quality of the individual communication links between devices. Performance of the links is likely to vary with time and conditions. Without being provided with current information about the network state, however, devices may not be able to make decisions which provide suitable reliability of communication of data between them and to the data collection station 13 whilst keeping power consumption to a satisfactorily low level. The invention in some aspects is concerned with providing devices with information about current network topology and reliability so that they can make informed decisions about data forwarding and/or exchange.

Figure 2:
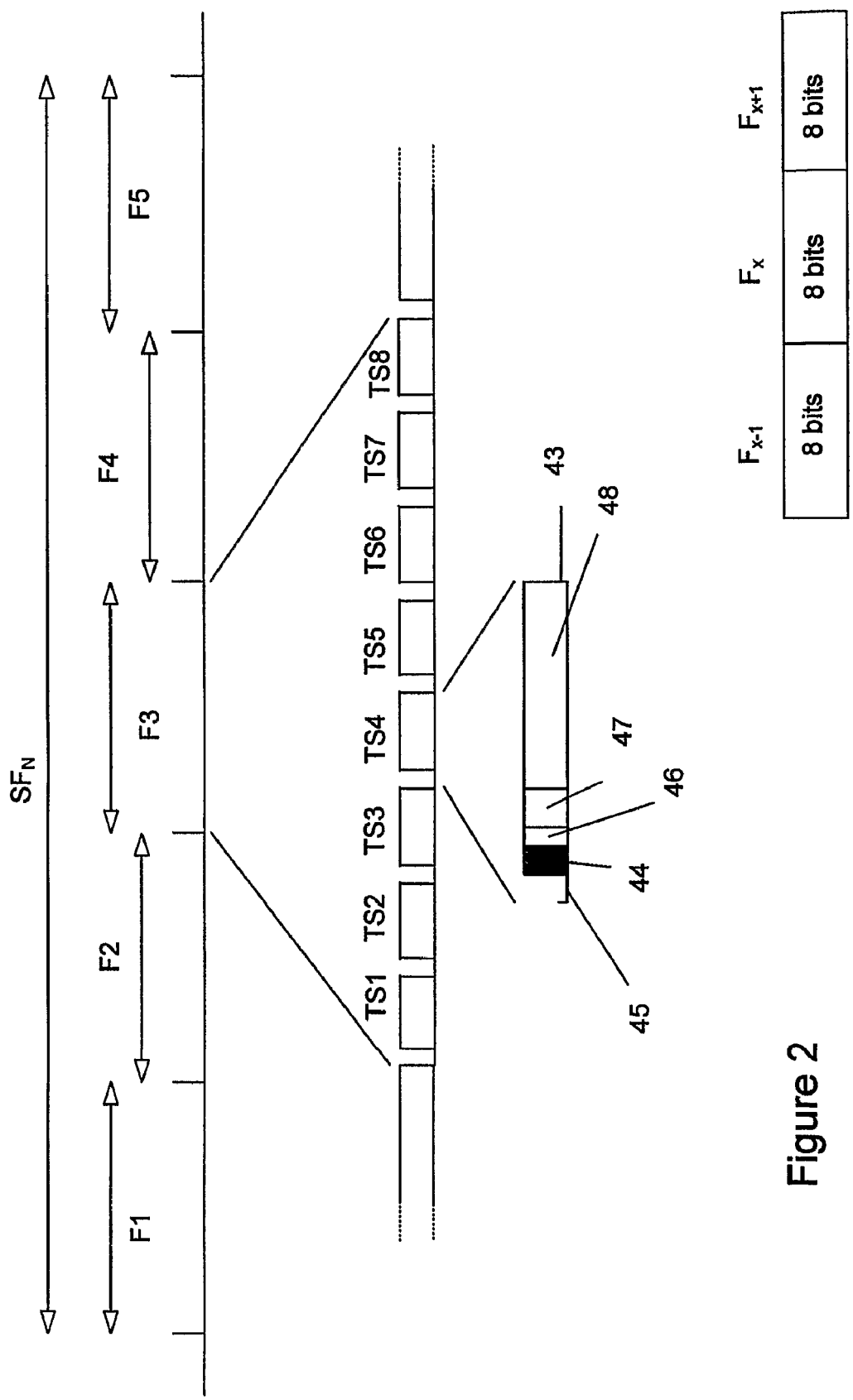
FIG. 2 is a schematic diagram illustrating signal transmission timing allocations and packet contents.

Referring now to FIG. 2, each device is controlled to operate by transmitting on a single timeslot in a defined time multiplexing system. A superframe $SF_N$ is divided into first to fifth frames F1, F2, F3, F4 and F5. The frames F1 to F5 are of equal lengths. Each frame is divided into eight timeslots of equal length. In FIG. 2, the third frame F3 is shown expanded into first to eighth timeslots TS1, TS2, TS3 . . . TS8. The base stations 11, 12 co-operate to set and correct superframe alignment in time. The superframes are of fixed length. Frames do not have frame markers associated therewith. All base stations 11, 12 are synchronised to one another, for instance by using a GPS receiver on each base station to provide a timing reference, so as to provide synchronicity over the network. The beginning of each superframe is not marked in any transmissions.

Each device independently selects a frame in which to operate using information from received transmissions. From a quiet network, the persistent transmissions of the base stations 11, 12 would be received by devices in hop depth 1. Hence, the devices initially likely to select a frame are the ones in range of the base station(s) (Hop depth 1). Other devices outside of this range (hop depth>1) are unable to detect any transmissions so do not themselves transmit. Once devices from hop depth 1 have selected their frame, they will start using their allocated time slots. As a result of this activity, devices in the next hop depth will choose their frame. This continues until all devices which can be hopped to from a base station 11, 12 begin transmitting. A device changes its selected operating frame only rarely, as is explained below.

Operation is within a narrow band of spectrum at 173 MHz. All transmissions are orthogonal and at the same frequency, occupying the whole of the bandwidth allotted to the system. The system is a fixed power system in which all devices transmit at the same power whenever they transmit. There is no explicit feedback between devices, so there is no power control, although power control can be employed, as is explained below.

In operation, a device internally keeps mechanisms for maintaining synchronicity with time alignment and superframe interval. From the number of frames in a super-frame (in this example, 5), a device uniquely identifies three consecutive frames as operating range frames (ORF). Using the successive allocation of frames described previously, the ORF cover the geographical area that the transmissions of the device can be successfully decoded in. If transmissions are symmetrical, i.e. at the same power etc., the ORF also covers the geographical area in which the device can receive transmissions from remote transmitters. Devices only need to keep control of their individual ORF. The ORF will vary from region to region in the network. The second frame in the ORF is called the operating frame (OF), and one timeslot in it has been chosen for transmission—transmitting time slot (TTS). The transmit timeslot is selected by the device in harmony with other devices in the vicinity for avoiding interference. Device are not permitted to transmit on any other timeslot, either in its operating frame or in any other frame.

As an example, the device 20 may have selected the fourth timeslot TS4 in the third frame F3 as its transmit timeslot. The minimum assignable unit for accessing the channel for a device in this embodiment is a time slot.

In its transmit timeslot, a device transmits a packet in the form referenced at 43. The packet includes a timeslot marker 44, which follows a short guard period 45. The timeslot marker 44 is a preamble signal, i.e. a sequence of alternating ones and zeros or similar. Immediately following the timeslot marker 44 is an identifier field 46, which in this case comprises three bits, allowing it to take a value between 1 and 8. After the identifier 46 is a code field 47, which comprises 24 bits. After the code field 47 is a payload 48, the size and contents of which are not relevant to this explanation and so are omitted for the sake of conciseness. In preferred implementations, the payload comprises 16 bytes of data.

The value included in the identifier field 46 indicates the number of the transmit timeslot in the operating frame. Thus, a value of 000 in the identifier field 46 may indicate the first timeslot TS1 and a value of 001 in the identifier field 46 may indicate the second timeslot TS2. The value of the code in the code field 47 indicates details of the neighbourhood of the device 20, as is explained in more detail below.

Each device is associated with a particular transmit timeslot, and thus the transmit timeslot acts as an identifier of that device. The combination of frame and timeslot may not be unique to the device, but it should be unique locally to the device. Devices do not normally transmit any explicit identifier, although such may form part of payload data. Not transmitting explicit identity data can help to reduce the amount of data transmitted between devices.

The packet transmissions do not include special fields or arrangements for acknowledgement of receipt of successful reception. This is particularly advantageous in the presence of unreliable communication links since acknowledgement messages consume limited bandwidth and may not be reliably received themselves. Attempts to synchronise the collection of packets successfully received in the neighbourhood in a rapidly changing fading wireless environment can prove to be very complex and resource consuming. Instead, devices make calculations to estimate the likelihood of payload data having been passed correctly to other devices and the likelihood of it being correctly passed onto devices further downstream. Although this scheme requires more complex calculations to be performed at the devices, these are simple enough to be implemented in microcontrollers. It provides the advantage of being resilient to variable levels of disruption. It results in reduced use of bandwidth and other communication resources than would a scheme using acknowledgement messages.

Devices can accurately determine frame alignment by listening to packet transmissions from other devices. Appropriate provision is made for error margins. In particular, by detecting the transmission of a packet from another device, the device can identify packet and symbol timing (some of this information comes from the preamble comprising the timeslot marker 44), the duration of the transmission and the transmit timeslot. From this information, particularly the packet timing and the transmit timeslot number, the receiving device performs an extrapolation to determine the start time of the frame and all of the other timeslots in the frame. Having this information and having selected a timeslot, the device continuously determines and adjusts the parameters of its transmit timeslot and transmits on it in plural superframes. The transmit timeslot constitutes a channel. The channel (timeslot) allocation process may also be known by the acronym CHAP.

The devices cannot determine the absolute value of their hop depths, nor where their operating frame falls within the superframe structure. Devices cannot distinguish between base stations 11, 12 and devices 20-35 by examining their transmitted packets. However, base stations retain their time alignment and time slot, and the devices 20-35 realign their perception of time based on the transmissions they receive. This does not impinge on successful operation.

Figure 3:
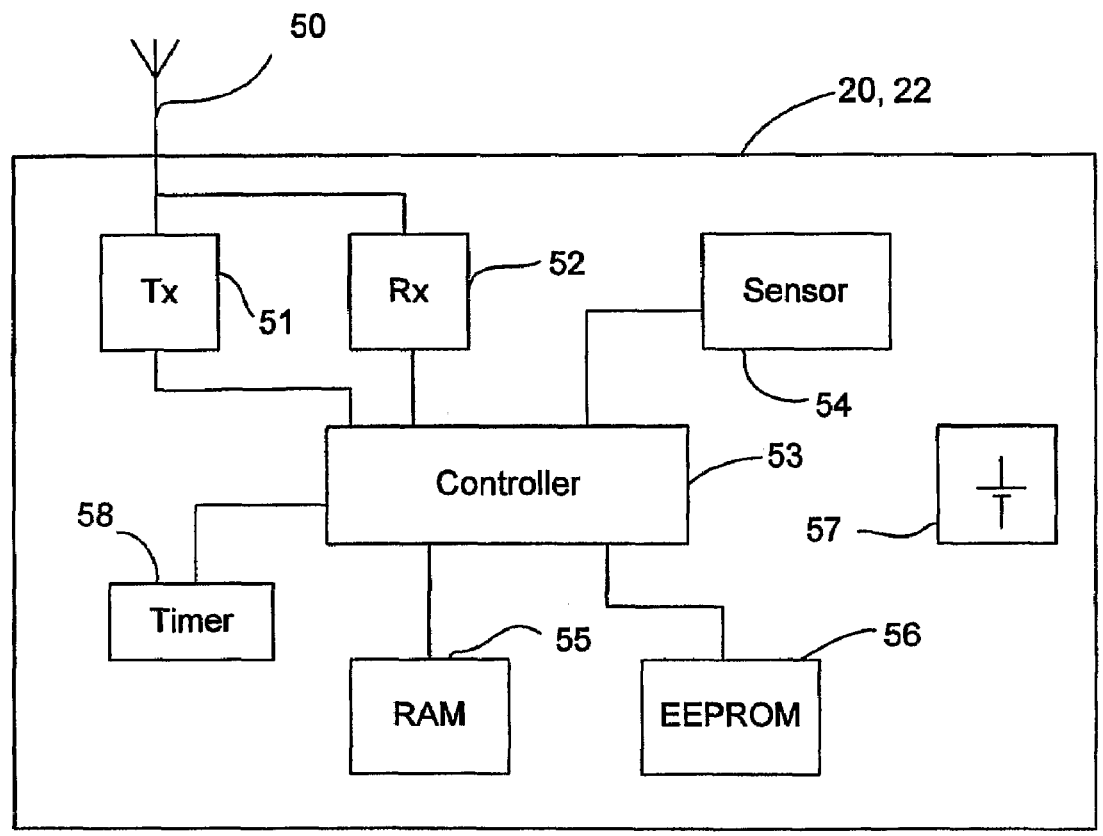
FIG. 3 is a schematic diagram illustrating the hardware of a wireless device forming part of the FIG. 1 system and incorporating aspects of the invention.

Components of a device are shown in FIG. 3. Here, the device 22 is illustrated. All the other devices have the same configuration. The device 22 includes an antenna 50, which is connected to a transmitter 51 and to a receiver 52. A controller 53 is connected to the transmitter 51, the receiver 52, a sensor 54, some RAM 55 and a non-volatile memory, such as an EEPROM 56. All the components of the device 22 are powered by a battery 57. The controller 53 operates under control of a computer program which is stored permanently in the EEPROM 56 and which operates using the RAM 55 as temporary storage. Operation of the device 22 thus is carried out in dependence on the instructions which form the computer program. A timer 58 is used to keep time, and is connected to the controller 53 so that the timer 58 can be controlled thereby and can provide time signals thereto.

Each device is arranged to operate its receiver 52 on the timeslots in its operating frame, in the frame immediately preceding the operating frame, and in the frame immediately following the operating frame. Operation of the receiver means demodulating any RF signal incident on the antenna 50 and attempting to decode any data on that signal. Thus, operation of the receiver 52 also can be termed monitoring packet transmissions. In the case of the device 22, which operates on the third frame F3, the device 22 is arranged to monitor packet transmissions in the timeslots of the second, third and fourth frames F2, F3 and F4. Advantageously, the device 22 is arranged to monitor packet transmissions in all of the timeslots of the second, third and fourth frames F2, F3 and F4 except during the transmit timeslot of the device 22. This exception protects the receiver 52 against potentially damaging power from the transmitter 51.

When a packet is correctly received from another device, the device 22 separates the code of the received packet from the payload data. The code is stored in a code database in the RAM 55 or the EEPROM 56.

Received codes are stored according to the timeslot of the ORF in which they were received. When a code is not received in a particular timeslot, a flag indicating this is stored in the code database. For each stored code, the code database also comprises an indication of the superframe in which the code was received. Codes are stored only for a predetermined number of superframes. The number may be 128 superframes. Thus, all codes which relate to superframes preceding the current superframe by more than 128 superframes are overwritten or ignored. In this way, a count of the number of codes stored in respect of a particular timeslot is dependent on the reliability of communications between the two relevant devices, i.e. the receiving device and the device which transmits during that timeslot. The significance of the storage of received codes will become apparent later.

The payload data is stored in a payload database, also in the RAM 55 or the EEPROM 56.

Signals are monitored by the device 22 in each of plural superframes. In each superframe, the device 22 makes a determination as to whether each of the timeslots is occupied. A timeslot is determined to be occupied if data can be decoded from a signal received in that timeslot. This is advantageous since the device determines a timeslot to be occupied only if information can be received in that timeslot. Although a timeslot could be determined to be occupied in some other manner, for instance by comparing a measure of received signal strength to a threshold, this would not detect collisions. Put another way, this allows the device 22 to distinguish between timeslots that are singly occupied on the one hand, and timeslots that are either unoccupied or multiply occupied on the other.

The device 22 monitors activity in timeslots over a predetermined number of superframes. For instance, the device 22 monitors activity in timeslots over eight superframes. From this, the device 22 calculates a measure of the reliability of packet transmissions over the channel that comprises the timeslot. The reliability in this sense is a measure of the likelihood of packet transmissions on that timeslot being correctly received. Since in normal circumstances only one device transmits in a given timeslot in a given area, the reliability of packet transmissions in a timeslot is indicative of the reliability of packet transmissions between the device 22 and the device which is transmitting on the timeslot being examined.

In particular, the device 22 calculates a measure of the proportion of successful packet transmissions to unsuccessful packet transmissions. This may be provided in any suitable way, for instance as a mere count of successful packet transmissions, i.e. ones in the corresponding position in the code database, as a percentage or as any other suitable measure. Preferably, the measure is performed on a rolling window basis. As activity for a new superframe is determined, the activity determined for the oldest superframe is disregarded. This maintains a rolling average.

The device 22 uses the measure of the proportion of successful packet transmissions to unsuccessful packet transmissions to determine whether the timeslot is occupied. Put simply, timeslots which carry packet transmissions with a reasonable success rate are deemed to be occupied, and timeslots which do not carry transmissions or which carry packet transmissions with a low success rate are deemed to be unoccupied. Determining whether or not a timeslot is occupied may involve the simple comparison of the measure of the proportion of successful packet transmissions to unsuccessful packet transmissions to a threshold.

Since the rolling average is performed over a relatively small number of superframes, in this case eight superframes, the determination as to timeslot occupation is subject to change quickly if the reliability of packet transmissions changes.

On the basis of the information about timeslot occupation, the device 22 prepares a code for transmission in the code field 47. In the main embodiment, the code comprises one bit for each timeslot in a one hop neighbourhood of the device 22. In particular, the code comprises three bytes; the first byte relating to the frame preceding the operating frame, the second byte relating to the operating frame, and the third byte relating to the frame immediately following the operating frame.

Each byte includes a bit for each timeslot. The bit is one if the timeslot is occupied, and is zero is the timeslot is unoccupied. Thus, if the device 22 determines that the second and fifth timeslots of a frame are occupied and the other timeslots of that frame are unoccupied, the byte created for that frame is 01001000. The code 00101100 00001101 10001000 (spaces are used to delimit bytes to allow easier reading) indicates that the device 22 determines that the only occupied timeslots in a one hop depth neighbourhood are the third, fifth and sixth timeslots of the frame preceding the operating frame, the fifth, sixth and eighth timeslots of the operating frame, and the first and fifth timeslots of the frame following the operating frame. The code generated by the device is transmitted in the code field 47 of every packet that the device 22 transmits.

This code is valuable to other devices 20-35 for a number of reasons.

A device 22 receives the codes transmitted by other devices which are both sufficiently nearby that signals can be received (i.e. are within one hop distance) and consequently have an operating frame within the ORF of the device 22. The codes, insofar as they relate to one of the preceding 128 superframes, are stored in the code database, as mentioned above. The device can use these stored codes to make inferences about the wider device neighbourhood in the network. This is then used by the device 22 to make decisions about the routing of payload data. Some examples follow.

In an example scenario, the device 22, being part of the concentration of devices 22-29, has reliable links with all the other devices 23-29 in the concentration, and with the nearby devices 31, 33 and 34. For this example, it is assumed that the devices 34, 35 are at a hop depth of one (holding different transmit slots in frame F1), the devices 22-29 are at a hop depth of two (so have different transmit slots in F2), the device 33 is at a hop depth of three (so has a transmit slot in F3), and the device 31 is at a hop depth of four (so has a transmit slot in F4).

The codes received from a device operating at a lower hop depth can be used to determine which neighbouring devices can also communicate with that lower hop distance device. For instance, the device 22 can reliably receive communications from the devices 23-29, 33, 34 and 35, all of which are within a one hop neighbourhood. Moreover, the codes transmitted by the devices 23-29 and received and stored by the device 22 allow the device 22 to determine which of the devices 33, 34, 35 at different hop distances to the devices 22-29 have reliable communications with the devices 23-29. The device 22 then uses this information to make routing, packet forwarding and time slot allocation decisions. Generally speaking, if a device, such as the device 22, determines that it is the only device that has reliable communication with a device at a greater hop distance, the device 22 applies a high priority to forwarding payload data received from that higher hop distance device. Conversely, if a device, such as the device 22, determines that it is one of a number of devices which have reliable communications with a greater hop distance device, and which also have access to lower hop distance devices, then the device 22 applies a low priority to forwarding payload data from the higher hop distance device. It is possible to do this without increasing the probability of the payload data not reaching lower hop depth devices since there are a number of other devices which can relay the information instead.

Reliability of links in challenging wireless environments such as those to which the invention is primarily addressed does not regularly follow narrow Gaussian distributions. High variability and long blackouts can be present for many different reasons. Being able to identify the reliability of the links without central authority and complex equipment and methods thus is very advantageous. If the wireless propagation environment is properly surveyed, the reliability of the links can be reasonably assessed by simple methods applied to the persistency and quality of the most recent events. Autonomous distributed algorithms are well known by their resilience and their provision of suitable levels accuracy in scenarios in which high performance cannot be expected.

Moreover, the device 22 is arranged to analyse the history of codes received in a timeslot to make a determination as to the reliability of links between each of the other devices 23-29 at the same hop level and the relevant devices 33, 34, 35 at different hop levels. Thus, the device 22 is able to determine which, if any, of the other devices 23-29 at the same hop distance have more reliable links with the relevant devices 33, 34, 35 at different hop levels. This information is available by comparing the bits of the received codes that relate to the relevant timeslot, i.e. the transmission timeslot related to the relevant device at a different hop level, to the same bits of the codes generated by the device 22. A greater historical number of 1s is indicative of a more reliable link. Of course, because devices do not normally correctly receive all packets received from neighbouring devices, the perception of the device 22 as to the reliability of the link between another device 23-29 at the same hop distance and a device 33, 34, 35 at a different hop distance may be different to the actual reliability of that link.

So as to provide a suitable probability of payload data reaching a base station 11, 12 whilst making efficient utilisation of available spectrum and other communication resources, the devices 20-35 preferably make a decision as to whether or not to route payload data based on the inferred/ detected device neighbourhood and an algorithm involving a random number. In the absence of a random element in a relaying decision-making algorithm, it may be that the probability of payload data being forwarded when there is a high number of devices that are able to forward the payload data decreases.

The fact that the link reliability as perceived by the device 22 can depart from the actual situation is advantageous since it means that, statistically, different devices will normally make different inferences about the same link. This makes payload data forwarding algorithms based on probabilistic algorithms more effective.

Routing decisions can also take into account the payload data of received packet transmissions. For instance, if a device determines that one or more other devices at the same hop depth as itself have transmitted particular payload data which the device also has received from a device at a greater hop distance, and determines that those one or more other devices are in reliable communication with one or more devices at a lower hop distance (as can be determined by analysis of the codes received from those devices), then the device can make a decision not to forward the payload data.

The decision whether or not to forward the particular payload data may also take into account any differences in the lower hop depth devices which are neighbours of the device and the one or more devices at the same hop depth. In particular, the device may give a higher weight to forwarding payload data which is also being forwarded by devices at the same hop depth if the device is in reliable communication with one or more devices at a lower hop distance that the other devices at the same hop distance are not in communication with. Conversely, the device may give a lower weight to forwarding payload data which is also being forwarded by devices at the same hop depth if the device is not in reliable communication with any devices at a lower hop distance except for devices at the lower hop distance with which other devices at the same hop distance are also in reliable communication.

Figure 4:
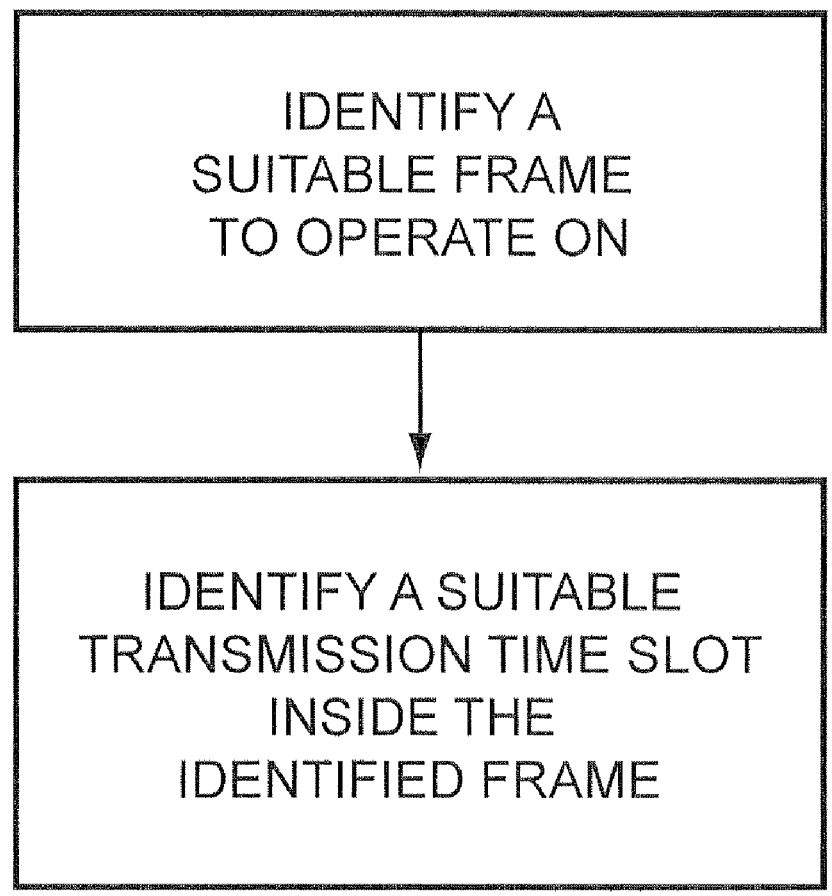
FIG. 4 is a schematic diagram illustrating the method steps for the channel allocation process.

The channel allocation process (CHAP) will now be described see FIG. 4. In particular, a device 22 can also use received codes in its channel allocation process (CHAP).

CHAP occurs in two stages. During the first stage, the device will identify a suitable frame to operate in. This is based on its ability to establish links with its neighbourhood, as mentioned above. This makes it possible to time its ORF correctly. During the second stage, the device identifies a suitable TTS inside the identified frame.

The pace of the CHAP is relevant. By choosing the right pace, interference free environment in a wireless challenging environment can be obtained. A rapid frame and TTS selection process would not consider hidden and interfering transmitters which temporarily not visible because of the changing channel.

During the first stage, the device 22 waits and observes if can identify traces of wireless network activity. A total absence or very erratic network activity signals that the cost of network operation is very high or absolutely ineffective. Because of the way the frames are allocated, devices will normally be able to identify very clear network activity in few frames from its local view of superframe. The device 22 selects an operating frame on the basis of these observations. The first stage of CHAP only involves using local observations over a relatively small number of superframes.

During the second stage, the device 22 uses the codes received over the period of observation for producing the current map of its 2-hop distance neighbourhood. This mapping provides the group of TTS which can be used for keeping the interference free network environment. The device 22 selects a TTS on the basis of the received codes.

The system provides similar considerations for updating the perspective of the 2-hop neighbourhood. In mild cases, it includes the update of one member of the network (no longer present, or a new member); less often will include changes such as change of frame (because the links in the lower hop depth are becoming unacceptably unreliable) and a search for a new operating frame is launched using CHAP. With the latter, the device 22 may signal to neighbouring devices that there no longer are conditions in which to operate at a reasonable cost.

In the second stage, the device 22 allocates a TTS to itself using its own determinations as to whether timeslots are occupied by using received codes. If a received code indicates that a particular timeslot is occupied, the device does not select that timeslot as its transmit timeslot even if the device determines that timeslot to be unoccupied. This is advantageous since the device can avoid using a timeslot which is being used by another device even if that other device is out of range of the device. This minimises the possibility of packet transmission collisions.

If after CHAP and after the device 22 has been operating for some time the device receives codes which indicate that the transmit timeslot of the device is unoccupied, the device infers that there is a collision on its TTS and thus selects a different transmit timeslot. This is advantageous because the transmission of codes by neighbouring devices which indicate that the timeslot on which the device 22 is transmitting is apparently unoccupied indicates that the neighbouring devices are being subjected to a collision of two or more packet transmissions on that timeslot. (This problem has been described previously in the literature as the "transmitter in the middle" problem—two transmitters are too far apart to detect each other directly and therefore cannot detect that their transmissions are interfering with each other at some intermediate point). A decision to select a different transmit timeslot may involve calculating an estimate of the probability of the available information being indicative of collisions, since a minor device error or minor differences between device characteristics might otherwise result in unnecessary transmit channel reallocation.

The devices 20-35 are arranged to use received codes and/or received payload data to obtain a measure of system performance. The measures of system performance are used to make payload data forwarding decisions.

As an example, the device 22 is arranged to determine from packets received from neighbouring devices a measure of the reliability of transmission of payload data from the device 33 at a greater hop distance to devices one hop depth closer than it to a base station, such as the devices 34, 35.

This is achieved by comparing transmissions from the device 33 with transmissions from the devices 34, 35 to ascertain that payload data from the device 33 is being transmitted by one of the devices 34, 35. If it is and this is being achieved without the forwarding of the payload data by the device 22, then the device makes a determination that there is a reliable transmission path around the device 22. In this instance, the device infers that it is not needed to forward payload data originating from the device 33, and so makes a decision not to forward such data. This involves monitoring of the payload data in received packets but does not involve analysis of received codes.

When deciding whether to forward data, the device 22 pays special attention to messages generated at a higher hop depth than it (i.e. occurring in the first frame of the ORG, just before the operating frame). The device needs to make two considerations about the received payload: the relevance of having the payload re-transmitted by multiple recipients, and the likelihood that the forwarded packet can reach the next hop towards the base stations. The likelihood that the forwarded packet can reach the next hop towards the base stations indicate the possibility that the forwarded packet will be lost. This can be assessed by the locally perceived consistency and number of links of the visible devices with hop depth lower than the device. This can be implemented using a simple look-up to a table of thresholds. An inconsistent group of links and low number of neighbours indicate a high probability of having the packet lost.

Alternatively, the device 22 determines whether it is needed to forward data from the device 33 by analysing received codes. In particular, the device 22 can determine which of the devices 23 to 29 are in communication with the device 33 by examining the codes transmitted by those devices. If the code transmitted by the device 33 includes a 1 at a position indicative of the timeslot occupied by the device 23, and the code received from the device 23 includes a 1 at a position indicative of the timeslot occupied by the device 33, the device 22 can infer that the devices 23, 33 are in reliable communication with one another. Of course, this determination involves making a calculation using all the codes received from those devices in the preceding 128 superframes. The computation complexity required to make this analysis is relatively low small since it includes mainly operations over chains of single bits and such operations can be efficiently implemented in microcontrollers. In the same way, the device 22 determines which of the devices 23 to 29 are in communication with the devices 34 and 35 by examining the codes transmitted by those devices. When it detects a reliable transmission path from the device 33 around the device 22 to one or both of the devices 33, 34, the device 22 makes a determination that there is a reliable transmission path around the device 22. In this instance, the device 22 infers that it is not needed to forward payload data originating from the device 33, and so makes a decision not to forward such data. This involves monitoring codes of received packets but not payloads thereof.

The relevance of having the payload data re-transmitted by multiple recipients can be assessed by the device 22 examining the code in the packet that the payload data was received in transmission and counting the number of visible potential forwarders. The device 22 is more likely to forward payload data with fewer potential forwarders.

In a further alternative, a device uses both received codes and received payload data to determine a measure of the reliability of transmission links around the device, from devices at a greater hop depth to devices at a lower hop depth. There are numerous possibilities for determining the transmission reliability.

Once a device has made a decision to forward payload data, or wants to send payload data that has been generated by its own sensor 54, the device determines how many retransnmissions are required.

For instance, the device may calculate a number of retransmissions based on the mean distance, or average time, between successful message receptions from a target device. By monitoring the number of successful and unsuccessful packet transmissions from a target device to the device, the device can infer information about the likelihood of the target device receiving packet transmissions from it, based on an assumption that forward and reverse communication channels between the device and the target device are approximately equally reliable. The device then calculates the number of retransmissions based on this determined probability. If the mean time or distance between correctly received messages is one superframe, i.e. there is a very reliable link between the device and the target device, the device sets the number of retransmissions to be zero. Put another way, the device assumes that the target device will receive the packet transmission correctly without any retransmission being needed. If the mean distance between correctly received messages is greater, the device sets the number of retransmissions such that the probability of success meets a predetermined value. For a predetermined success rate to be achieved, the number of transmissions required can thus be determined from the mean distance.

A very large mean distance between correctly received messages indicates that there is a very unreliable link between the device and the target device. in this case the device does not attempt any transmissions at all, but seeks another target device by which to route the payload data via that target device.

Of course, instead of using mean time separation between successful packet transmissions, any other suitable measure of transmission reliability can be used.

The number or re-transmissions may depend also on the likelihood that the forwarded payload data will be able to reach the next hop towards the base stations. This can be assessed by the locally perceived consistency and number of links of the visible devices with hop depth lower than the device, as discussed above. An inconsistent group of links and low number of neighbours indicate a high probability of having the packet lost. When this is detected by the device 22, it increases the number of retransmissions to increase the probability of it being received. Conversely, if the device 22 determines that there is a highly reliable group of neighbours, the device 22 may reduce the number of re-transmissions and instead be immediately removed from buffers.

Since there is no acknowledgement of receipt of packets, the device can only estimate the probability that the target device has correctly received the packet by examining the code received from the target device. However this does not allow the device to determine with certainty whether or not the packet was received at the target device.

Of course, even if the payload data is received by the target device, it is not certain that the target device will forward it onto a device at a lower hop depth. Instead, the target device will itself make a decision as to whether to forward the payload data based on its understanding of its neighbourhood at a two depth level, according to an algorithm. In this connection, it will be appreciated that a device has awareness not only of devices at hop depths immediately above and below it. By examining the codes received from devices at hop depths immediately above and below it, a device can also obtain awareness of other devices in its vicinity and operating at two hop levels away from it, both above and below. This information is used by devices when determining whether to move to a different hop level, i.e. whether to move their transmit slot to a different frame.

The device 22 is arranged, on determining that there is a reliable link around the device 22, to reduce use of its transmitter 51 and/or its receiver 52. The extent to which the device 22 reduces use of its transmitter 51 and/or its receiver 52 may be dependent on a measure of the reliability of the transmission path around the device, the number of transmission paths around the device, and/or a random element.

In an extreme example, the device 22 may enter a sleep mode for an extended period, thus making significant power savings. On re-awakening from a sleep mode, the device 22 may be arranged to monitor transmissions from other devices for some time, for instance 128 superframes, before making any inferences about its neighbourhood or making any routing decisions or decisions as to its transmit timeslot.

In a less extreme example, the device 22 may simply cease transmitting for a period of time, for instance between 2 and 50 superframes. Not transmitting packets saves power. It also has an effect on neighbouring devices since they do not receive transmitted packets from the device 22 whereas previously they had been receiving packets. Those devices therefore adjust their behaviour as a result of the device 22 not transmitting. However, this does not reduce network performance since the other devices 23 to 29 necessarily take the apparent absence of the device 22 into account in their decision-making regarding the forwarding of payload data.

The device 22 may operate its receiver 52 even if it is not operating its transmitter 51. This allows the device 22 to continue monitoring its neighbourhood, for example to determine if the conditions that caused it to enter sleep mode have changed. Alternatively, the device 22 may also cease operating its receiver 52.

The device 22 includes a scheduling function. The scheduling function comprises software which is stored permanently in the EEPROM 56 and which operates on the controller 53 using the RAM 55. The scheduling function utilises a time output of the timer 58. The scheduling function determines the times at which the device 22 performs the various actions that constitute its function.

The scheduling function controls the device 22 to perform calculations and other functions at times other than times when the transmitter 51 or the receiver 52 is in use. This allows a simpler form for the controller 53 to be used, which has savings in terms of cost and/or power consumption.

One activity which the scheduling function causes the device 22 to perform when the transmitter 51 and the receiver 52 are not in use is sensing, using the sensor 54. In normal operation, sensing is performed within the two out of the five frames of the superframe (i.e. within the two-fifths of the superframe) in which the receiver 52 is not operating. However, the sensing operation needs to be performed relatively infrequently, so the scheduling function does not operate the sensor 54 in every superframe. Sensing also may not utilise all of the time between successive operations of the receiver 52. A typical sensing operation takes an amount of time corresponding to between only 1 and 5 timeslots. The scheduling function ensures that the sensor 54 operates only when the controller 53 is not being used to operate the transmitter 51 or the receiver 52.

Another activity which the scheduling function causes the device 22 to perform when the transmitter 51 and the receiver 52 are not in use is the running of algorithms. These algorithms provide many of the determinations described above, for instance performing statistical calculations to determine local network conditions, making routing decisions, compressing and decompressing codes (if required), etc. The scheduling function ensures that these calculations are performed only when the controller 53 is not being used to operate the transmitter 51 or the receiver 52.

If the device 22 does not need to perform any sensing or calculations, it hibernates for the two frames of the superframe where its receiver 52 is not required to be operated. This allows it to save power. Hibernation in this sense will be understood to be the closing down of components of the device 22 that would normally be powered even if not performing a function. In the device 22, powering-down of the controller 53 during such periods results in a significant power saving. Powering-down may involve the switching-off of a component or the entering by the component into a low power or standby mode.

As there is a period in which the device 22 is not required to utilise the controller 53 to operate the receiver 52 and the transmitter 51, this allows the device to minimise the use of interrupts, and to minimise process context switching. This allows the device 22 to operate more efficiently but without there being the possibility of it missing any communications (transmitting or receiving) which are relevant to it. Put another way, more can be achieved with the hardware resources of the device 22 than would be possible if the device 22 was not aware of regular periods for performing non-transmitting and non-receiving tasks.

An additional advantage of this approach is a high level of efficiency achieved in the switching. An issue relevant to conventional hibernating methods is possibility of the network demanding service when the device is unavailable. Since the devices in this system are synchronised in the timing multiplexing system across the network, the possibility that a service is required outside of the ORF is very low.

Although this exemplary embodiment uses five frames per superframe, this may not be particularly realistic for many applications. The use of only a small number, for instance five, frames per superframes provides a very high duty cycle usage, which is satisfactory if power consumption is not a significant concern. Where power consumption, and thus battery life, is a concern, a figure of between ten frames per superframe would normally be more suitable. Since three frames are used for network purposes, 10 frames per superframe would give rise to $3/10$ average receiver usage per unit of time. Fifty frames per superframe would give rise to an average receiver usage of $3/50$ per unit of time.

As described above, the devices 20-35 are arranged to store codes received over the preceding 128 superframes. The devices 20-35 also are arranged to store a series of codes which are representative of the instantaneous operation of the links between the device and neighbouring devices. In particular, the device, for instance the device 22, is arranged to generate for each superframe a code of three bytes, each byte relating to a different one of the operating frame and the frames immediately preceding and following the operating frame. A bit of the code is a 1 if the device 22 correctly decoded a signal on the corresponding timeslot, and is a 0 if the device 22 did not correctly decode a signal on the corresponding timeslot. The code can thus be thought of as being the same as the transmitted code would be if no averaging were performed over plural timeslots. The code can be termed a local code since it is not transmitted.

The device 22 is arranged to store the local codes which have been generated in respect of 128 preceding superframes. This series of local codes is stored in the RAM 55 or the EEPROM 56.

The device 22 is arranged to apply an input sequence of bits comprising a particular bit from each of a sequence of the local codes to a phase-locked loop, which is implemented by software running on the controller using the RAM 55 and/or the EEPROM 56. The input sequence comprises bits relating to a single timeslot of interest and, thus, to another device in communication with the device 22. For instance, the input sequence may comprise the third bit of a succession of local codes stored in the device 22. Since the input sequence relates to plural local codes and each code relates to a different superframe, the input sequence is indicative of the variation in the success of communications over the link with the other device over time.

The phase-locked loop is arranged to produce a signal indicative of measures of the frequencies of the two most prominent components of the input sequence. The device 22 is arranged to determine which of the components has the higher frequency, and uses the measure of the frequency of that component to determine a local code depth value. For instance, the device 22 may store a look up table (LUT) in memory, the LUT relating ranges of frequencies of local code components to local code depth values. Higher frequencies of local code components give rise to lower code depth values. For instance, a local code components frequency of between 300 and 500 Hz might equate to a local code depth of 64.

The device 22 uses the local code depth provided by this step to adjust the length of input sequences which are subsequently generated. In particular, the device 22 is arranged to limit the length of input sequences to having a number of bits equal to the local code depth. Thus, the length of the input sequence is dependent on the way in which the link changes over time.

The disturbing factors affecting the wireless communication channel can be of a pseudo-periodic nature. This can be caused by disturbing objects that can be permanent (e.g. oceanic waves), or temporary (e.g. rain). The presence of disturbing factors produces distinctive impact to the wireless links according to specifics such as distance between devices, relative height, amongst others. If the database of events is stored for long enough periods, it is possible to detect the characteristic periodicity of the causes by the use of computational methods. The advantage of being able to detect this periodicity lies in the ability to predict the specific opportunities in which the efficiency of use of resources can be optimal.

Additionally, the same information could feedback scheduling and sensing applications to support decisions in a wider context—a storm is approaching, wind speed is larger than usual, etc.

From the different mechanisms available for detecting periodicity of a string of events, a phase locked loop has advantages in terms of simplicity for working on a binary signal. Wavelet, Fourier transforms and others can be used in place of a phase locked loop if sufficient hardware resources are preset in the device 22.

From the network point of view, once the periodicity is identified, two actions are possible. These are: firstly improving transmission efficiency, and secondly attempting to optimising the ability for detecting changing phenomenon with the network events.

Attempting to optimise the transmitting efficiency involves reducing expectations of packets being successfully received at times when link conditions are expected to be poorer, and increasing expectations of packets being successfully received at times when link conditions are expected to be better.

Looking at the second action, the benefits lie in improving the ability of the devices 20-35 for keeping track on changing external environments and consequently improving their performance.

The extent of the periodic disruptive elements indicates the benefits of maintaining a large or small database of local codes, i.e. a higher or a lower number for the local code depth. A higher local code depth requires higher computational load but provides higher accuracy. Additionally, maintaining large databases with simplified methods will overlook fast changing events in favour of long trend ones. In simpler embodiments, the size of the databases is fixed at deployment time based on previous surveys and data. Consequently, the ability of the devices 20-35 to take autonomous decisions correctly is constrained by the extent that the environment is the same as the surveyed characteristics. If additional flexibility and hence autonomy is required, mechanisms for changing thresholds and scopes are provided in the devices 20-35.

For applications demanding dynamic flexibility, detecting the periodicity of the disturbing factors and thus adjusting the settings of thresholds and scopes automatically provides certain advantages. Thus, instead of having a single set of threshold tables and fixed database scope, different sets are recorded in ROM covering several scenarios. A new collection of threshold tables and scopes can be chosen based on an analysis of the periodic structure of events and other predefined rules. For example, by analysing the collection of events (initially set to 128) the functions (for instance the phase locked loop) indicates a unique approximate periodicity value of 16. this indicates that the identified pattern is repeated every 16 superframes. The device 22 may choose to select a different parameters matching this new scenario. This may involve changing the local code depth value to 32, changing thresholds for re-transmitting packets to a more optimistic setting, amongst other parameter changes.

A variation of this will now be described. The output of the phase-locked loop is applied to a filter and the resulting signal is used to make a decision as to whether or not a link is used to carry payload data. The decision is fed back to the filter. The device 22 stores a record of the input sequence, the decision and a measure of the performance of the link in a period immediately following the decision having been made. The device 22 uses the record when subsequently making decisions as to whether or not to use a particular link. The device 22 thus is heuristic in the sense that it uses its experience in decisions. Thus, decisions which did not result in the required performance are less likely to be made subsequently in the same or similar circumstances. Decisions which resulted in greater performance are more likely to be made subsequently in the same or similar circumstances.

Since different devices 20-35 will have different experiences, and thus different histories, they will make different decisions given the same scenario input sequence. This allows devices to contribute to improved overall network performance. This is especially so since the network will be more resilient to sudden changes, for instance plural devices simultaneously stop being operational. This can happen for instance when a key link, such as a base station, fails.

Although in the above received codes from 128 superframe are stored, this is just an example. This example provided good results, although it requires a significant amount of memory and requires a substantial amount of processing. The optimal number of superframes for which received codes are stored and analysed can be determined by a designer from a survey of wireless propagation conditions before deployment of devices. Most conditions would get satisfactorily good results from storing and analysing received codes from between 16 and 48 superframes.

Although in the above the transmitted codes are described as comprising a single bit for every timeslot that it relates to, this is not essential. Instead, the transmitted codes may include more than a mere indication of whether timeslots are occupied. For instance, the code may include an indication of the degree of reliability of packet transmissions. For instance, using two bits for each timeslot can allow devices to indicate three different levels of packet transmission reliability. Such increased information about the neighbourhood of neighbouring devices can allow a device receiving such codes to make a greater number of inferences, and more reliable inferences, about the network.

Whether one or more bits are used to represent perceived timeslot occupation, the transmitted code may be a compressed version of data which indicates perceived timeslot occupation. For instance, the timeslot occupation data might be compressed using turbo coding.

Thus, the transmission of one bit in respect of each timeslot should be treated as a non-limiting example.

The above embodiment is relatively simple in that explicit feedback between devices is not provided, although such explicit feedback can be provided whilst remaining within the scope of the invention.

Additionally, although the described devices are fixed power devices, this is not essential.

For instance, devices may produce and record a received signal strength indicator (RSSI) or other measure indicative of parameters of received signals. For instance, the device may record an absolute value of RSSI, e.g. using 8-10 bits for each observation. Alternatively, it may record a coded version, for instance with 000 denoting no signal, 001—little signal, up to 110 very powerful signal, 111 extreme power. The device may on request or periodically transmit data indicative of the recorded RSSIs. Other devices may then record this data. These other devices then may compare the data received with its own measurements and/or with corresponding data received from other devices and take action as necessary. Furthermore, in respect of a target device, i.e. a device that the device wants to send data to, the device may adjust its transmitted power depending on the RSSI indicator received from the target device in respect of the link with the device. For instance, if the received RSSI measure is higher than a predetermined threshold, the device may reduce transmitted power by a step. If the received RSSI measure is lower than the predetermined threshold, the device may increase transmitted power by a step.

All of the devices 20-35 have the same construction and are provided with the same software. Thus, where in the above description reference is made to the structure or operation of a particular device, this applies also to each of the other devices.

Devices such as the devices 20-35 described above are not limited to use in oceanography. For instance, they may be used to measure atmospheric conditions by being attached to balloons. They may alternatively be used in river environments, either tethered or untethered. Further uses of the devices 20-35 may include monitoring glacier movement, lava flow and animal migration.

More generally, the invention may find application in ad hoc communication networks for communication in environments where there is no fixed network, for example for disaster recovery, or in battlefields, or in other circumstances where it is convenient for individual devices to relay information between each other to and from a central point to minimise the infrastructure required and the power requirements. It should be particularly noted that the invention scales well, because the wireless capacity in the devices acting as relays increases with the number of users (devices) using the system. Thus, a region does not require a large installed infrastructure to provide the necessary capacity for occasional very large peaks of demand—the users of the demand also supply the extra capacity to handle it. In particular, note that the average hop distance falls as the number of users in a given region increases, allowing greater channel re-use in that region.

Various alternative embodiments will be apparent to the skilled person. The invention is not limited by the above description, and is limited only by the appended claims and their equivalents.

The invention claimed is:

1. A method of operating a plurality of wireless devices each including a receiver and a transmitter, the method comprising:
   controlling each device to divide time into a succession of frames, each frame having plural timeslots, and into a succession of superframes, each superframe having plural frames;
   operating the receiver in each device in at least some of the timeslots of a selected operating frame over plural superframes;
   for each device, determining from the signals received by its receiver, which of the at least some timeslots of the selected operating frame are occupied by transmissions from the other devices;
   using the result of the determination to generate data relating to the presence and operational status of the other devices;
   transmitting data for reception by other devices, the transmitted data including the presence and operational status data generated by the device, and including the data generated by the device which relates to the presence and operational status of the other devices, wherein
   each device selects a transmit timeslot in a selected operating frame in each superframe in which to transmit payload data; and
   operating the receiver in all other timeslots of the selected operating frame.

2. A method as claimed in claim 1, comprising transmitting the presence and status data in the transmit timeslot.

3. A method as claimed in claim 1, wherein the transmitted presence and status data comprises a code having a single bit for each timeslot to which the data relates.

4. A method as claimed in claim 1, wherein the determination of whether a timeslot is occupied comprises determination of whether data is decodable from a signal received in that timeslot.

5. A method as claimed in claim 1, wherein the determination of whether a timeslot is occupied comprises monitoring signals received in that timeslot over plural superframes.

6. A method as claimed in claim 1, comprising operating the receiver in one or more timeslots of a payload receipt frame separate from the selected operating frame; and transmitting in a transmit timeslot of the operating frame, payload data received in a timeslot of the payload receipt frame.

7. A method as claimed in claim 6, comprising providing and transmitting presence and status data relating to the occupation of the timeslots of the selected operating and payload receipt frames.

8. A method as claimed in claim 6, comprising operating the receiver in one or more timeslots of a detection frame, the detection frame having a location in the superframe different to the selected operating and payload receipt frames, and providing and transmitting presence and status data relating to the occupation of the timeslots of the detection frame.

9. A method as claimed in claim 1, wherein each device generates presence and status data relating to neighbouring devices, and the presence and status data is transmitted to the neighbouring devices and stored therein.

10. A method as claimed in claim 9, wherein each device stores received presence and status data according to the timeslot in which the data was received.

11. A method as claimed in claim 9, wherein the device is arranged to analyse the presence and status information received from a second device in a particular timeslot over plural superframes to make a determination as to the reliability of links between the second device and one or more devices neighbouring the second device.

12. A method as claimed in claim 9, wherein the device is operable to make decisions as to whether to forward received data based on the received presence and status data.

13. A method as claimed in claim 12, wherein the device is operable to monitor the number of successful and unsuccessful transmissions from a target device to the device, to calculate therefrom the number of transmissions required to achieve a predetermined probability of at least one successful transmission, and to transmit an item of payload data on a number of occasions equal to the calculated number.

14. A method as claimed in claim 13, wherein the device is operable to calculate the number based also on presence and status data received in a timeslot relating to the target device.

15. A non-transitory computer readable medium carrying a computer program comprising instructions which, when executed by a data processing apparatus, causes the program to perform the method according to claim 1.

16. A device including one or more computer processors, a receiver, a transmitter and a controller, the device being configured:
   to use received signals to divide time into a succession of frames, each frame having plural timeslots, and into a succession of superframes, each superframe having plural frames;

to operate the receiver in at least some of the timeslots of a selected operating frame over plural superframes;

to determine which of the at least some timeslots of the selected operating frame are occupied;

to use the result of the determination to generate data relating to the presence and operational status of other devices;

to transmit data for reception by the other devices, the transmitted data including the presence and operational status data generated by the device, and including the data generated by the device which relates to the presence and operational status of the other devices, wherein the device selects a transmit timeslot in a selected operating frame in each superframe in which to transmit payload data; and to operate the receiver in all other timeslots of the selected operating frame.

* * * * *